United States Patent
Takeno et al.

(10) Patent No.: US 11,539,264 B2
(45) Date of Patent: Dec. 27, 2022

(54) VEHICLE ELECTRIC MOTOR

(71) Applicants: TOYOTA JIDOSHA KABUSHIKI KAISHA, Toyota (JP); AISIN AW CO., LTD., Anjo (JP)

(72) Inventors: Motoki Takeno, Nisshin (JP); Yoshitada Yamagishi, Okazaki (JP); Katsuhide Kitagawa, Seto (JP); Masaki Mori, Anjo (JP); Taketo Takeuchi, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 506 days.

(21) Appl. No.: 16/660,910

(22) Filed: Oct. 23, 2019

(65) Prior Publication Data
US 2020/0153310 A1    May 14, 2020

(30) Foreign Application Priority Data

Nov. 14, 2018    (JP) .............................. JP2018-214209

(51) Int. Cl.
*H02K 5/24*    (2006.01)
*H02K 1/18*    (2006.01)
(Continued)

(52) U.S. Cl.
CPC .............. *H02K 5/24* (2013.01); *H02K 1/185* (2013.01); *H02K 1/2706* (2013.01); *H02K 5/04* (2013.01); *H02K 7/006* (2013.01)

(58) Field of Classification Search
CPC ........... H02K 1/185; H02K 5/24; H02K 5/04; H02K 1/18; H02K 7/006
(Continued)

(56) References Cited

U.S. PATENT DOCUMENTS 7,462,969 B2 * 12/2008 Kawamoto .............. H02K 5/08
310/400
2008/0106163 A1    5/2008 Mizuno et al.
(Continued)

FOREIGN PATENT DOCUMENTS

CN    101111984 A    1/2008
CN    104321955 A    1/2015
(Continued)

OTHER PUBLICATIONS

JP-08182277-A (English Translation) (Year: 1996).*

*Primary Examiner* — Thomas Truong
(74) *Attorney, Agent, or Firm* — Oliff PLC

(57) ABSTRACT

A vehicle electric motor including: a tubular-shaped stator core constituted by electromagnetic steel sheets that are laminated on each other; a rotor disposed inside the stator core so as to be rotated about an axis; and a housing storing therein the tubular-shaped stator core and the rotor, and including a circumferential wall and axially opposite end walls that are opposed to each other in a direction parallel with the axis. The stator core is fixed at one of its axially end portions to one of the axially opposite end walls of the housing. The housing includes a stator-core-inclination restraining portion that protrudes from an inner circumferential surface of the circumferential wall of the housing toward a part of an outer circumferential surface of the stator core, wherein the part is located on a side of the other of the axially end portions of the stator core.

8 Claims, 6 Drawing Sheets

(51) Int. Cl.
*H02K 1/2706* (2022.01)
*H02K 7/00* (2006.01)
*H02K 5/04* (2006.01)

(58) Field of Classification Search
USPC .................. 310/89, 51, 402, 405–409, 418
See application file for complete search history.

(56) References Cited

U.S. PATENT DOCUMENTS

| | | |
|---|---|---|
| 2008/0258668 A1 | 10/2008 | Oguri et al. |
| 2009/0021104 A1 | 1/2009 | Hattori |
| 2009/0108700 A1* | 4/2009 | Sakuma ................. H02K 1/185 |
| | | 310/216.004 |
| 2015/0076940 A1 | 3/2015 | Ohashi et al. |
| 2017/0141628 A1 | 5/2017 | Nose et al. |
| 2018/0013324 A1* | 1/2018 | Takabe .................. H02K 1/187 |

FOREIGN PATENT DOCUMENTS

| | | | |
|---|---|---|---|
| DE | 112005003440 T5 | 3/2009 | |
| DE | 112008000387 B4 | 2/2018 | |
| JP | 08182277 A * | 7/1996 | ............ H02K 1/185 |
| JP | 2000-23405 A | 1/2000 | |
| JP | 2007-228725 A | 9/2007 | |
| JP | 2008-271680 A | 11/2008 | |
| JP | 2016-158389 A | 9/2016 | |
| JP | 2018-074654 A | 5/2018 | |
| WO | 2006/090484 A1 | 8/2006 | |

* cited by examiner

VEHICLE ELECTRIC MOTOR

This application claims priority from Japanese Patent Application No. 2018-214209 filed on Nov. 14, 2018, the disclosure of which is herein incorporated by reference in its entirety.

FIELD OF THE INVENTION

The present invention relates to a vehicle electric motor, more particularly, to a structure for supporting a stator core in the electric motor.

BACKGROUND OF THE INVENTION

There is known a vehicle electric motor including a cylindrical-shaped casing having a bottom wall, a cylindrical-shaped casing cover having a bottom wall, a tubular-shaped stator core constituted by electromagnetic steel sheets that are laminated on each other, and a rotor. For example, JP2007-228725A discloses, in paragraphs [0030] and [0040] of the specification and FIG. 8, an electric motor (rotating machine) for a hybrid vehicle, which includes a casing (220), a cover (230), a stator core (141) constituted by plate-shaped magnetic bodies that are laminated on each other, and a rotor (130), wherein the stator core (141) is supported in a cantilever manner by the casing (220) through fasteners (143), and wherein the casing (220) includes a small inside-diameter portion (A portion) in which the casing (220) is spaced apart from the stator core (141) by a relatively small spacing and a large inside-diameter portion (B portion) in which the casing (220) is spaced apart from the stator core (141) by a relatively large spacing. JP2007-228725A further discloses, in paragraphs [0034] through [0036] of the specification and FIG. 12, for preventing vibrations of the stator core (141) from being transmitted to the casing (220), an inside diameter of the large inside-diameter portion (B portion) of the casing (220) is set to be sufficiently large such that the stator core (141) is not brought into contact with the large inside-diameter portion (B portion) of the casing (220) even when the an angle (θ) of inclination of the stator core (141) is maximized.

SUMMARY OF THE INVENTION

By the way, in the vehicle electric motor as described above, since the inclination of the stator core is restrained by the casing, there has been a risk that the inclination of the stator core would become relatively large.

The present invention was made in view of the background art described above. It is therefore an object of the present invention to provide a vehicle electric motor that is capable of restraining inclination of a stator core in the electric motor. This object is achieved according to the following aspects of the present invention.

According to a first aspect of the invention, there is provided a vehicle electric motor comprising: a tubular-shaped stator core constituted by electromagnetic steel sheets that are laminated on each other; a rotor disposed inside the stator core so as to be rotated about an axis; and a housing storing therein the tubular-shaped stator core and the rotor, and including a circumferential wall and axially opposite end walls that are opposed to each other in a direction parallel with the axis, wherein the stator core is fixed at one of axially end portions thereof to one of the axially opposite end walls of the housing, and wherein the housing includes a stator-core-inclination restraining portion that protrudes from an inner circumferential surface of the circumferential wall of the housing toward a part of an outer circumferential surface of the stator core, the part being located on a side of the other of the axially end portions of the stator core.

According to a second aspect of the invention, in the electric motor according to the first aspect of the invention, the housing is constituted by a casing and a casing cover that are fixed to each other, wherein the casing includes an outer circumferential wall that is a part of the circumferential wall of the housing, a bottom wall that is the one of the axially opposite end walls of the housing and a mating surface that is provided by a distal end surface of the outer circumferential wall of the casing or provided in vicinity of the outer circumferential wall of the casing, wherein the casing cover includes an outer circumferential wall that is another part of the circumferential wall of the housing, a bottom wall that is the other of the axially opposite end walls of the housing, and a mating surface that is provided by a distal end surface of the outer circumferential wall of the casing cover or provided in vicinity of the outer circumferential wall of the casing cover, wherein the stator core is fixed, at a casing-side end portion thereof that is the one of the axially end portions, to the bottom wall of the casing; wherein the casing and the casing cover are fixed to each other, with the mating surface of the casing and the mating surface of the casing cover being in contact with each other, wherein the vehicle electric motor comprises a positioning engagement mechanism establishing an engagement by which the casing and the casing cover are positioned relative to each other with the mating surface of the casing and the mating surface of the casing cover being in contact with each other such that an inner circumferential surface of the outer circumferential wall of the casing and the inner circumferential surface of the outer circumferential wall of the casing cover are coaxial with each other, and wherein the stator-core-inclination restraining portion protrudes from an inner circumferential surface of the outer circumferential wall of the casing cover, toward a casing-cover-side outer circumferential surface of the stator core, the casing-cover-side outer circumferential surface being the part of the outer circumferential surface of the stator core which is located on a side of the casing cover.

According to a third aspect of the invention, in the electric motor according to the second aspect of the invention, the casing includes a stator-core positioning portion that protrudes from the inner circumferential surface of the outer circumferential wall of the casing toward a casing-side outer circumferential surface of the stator core, the casing-side outer circumferential surface being a part of the outer circumferential surface of the stator core which is located on a side of the casing.

According to a fourth aspect of the invention, in the electric motor according to the second or third aspect of the invention, the stator core includes an overlapping portion that overlaps with the stator-core-inclination restraining portion in a direction perpendicular to the axis about which the rotor is to be rotated, wherein the overlapping portion of the stator core has a length measured in an axial direction parallel with the axis while the engagement established by the positioning engagement mechanism has a length measured in the axial direction, such that the length of the overlapping portion of the stator core is shorter than the length of the engagement, with the mating surface of the casing and the mating surface of the casing cover being in contact with each other.

According to a fifth aspect of the invention, in the electric motor according to any one of the second through fourth aspects of the invention, the stator-core-inclination restraining portion and the casing-cover-side outer circumferential surface of the stator core are spaced apart from each other by a first distance measured in a direction perpendicular to the axis about which the rotor is to be rotated, wherein a casing-cover-side inner circumferential surface of the stator core and a casing-cover-side outer circumferential surface of the rotor are spaced apart from each other by a fourth distance measured in the direction perpendicular to the axis, the casing-cover-side inner circumferential surface of the stator core being a part of an inner circumferential surface of the stator core which is located on a side of the casing cover, the casing-cover-side outer circumferential surface of the rotor being a part of an outer circumferential surface of the rotor which is located on a side of the casing cover, and wherein the first distance is shorter than the fourth distance.

According to a sixth aspect of the invention, in the electric motor according to any one of the second through fifth aspects of the invention, the stator-core-inclination restraining portion and the casing-cover-side outer circumferential surface of the stator core are spaced apart from each other by a first distance measured in a direction perpendicular to the axis about which the rotor is to be rotated, wherein the inner circumferential surface of the outer circumferential wall of the casing cover and the casing-cover-side outer circumferential surface of the stator core are spaced apart from each other by a second distance measured in the direction perpendicular to the axis, wherein an inner circumferential surface of the outer circumferential wall of the casing and a casing-side outer circumferential surface of the stator core are spaced apart from each other by a third distance measured in the direction perpendicular to the axis, the casing-side outer circumferential surface being a part of the outer circumferential surface of the stator core which is located on a side of the casing, and wherein the first distance is shorter than the second distance and the third distance.

According to a seventh aspect of the invention, in the electric motor according to any one of the second through sixth aspects of the invention, the mating surface of the casing and the mating surface of the casing cover, which are in contact with each other, are located in respective positions that overlap with the stator core in a direction perpendicular to the axis about which the rotor is to be rotated.

According to an eighth aspect of the invention, in the electric motor according to any one of the second through seventh aspects of the invention, the stator-core-inclination restraining portion is a protruding portion which is integrally formed with the casing cover and which protrudes from the inner circumferential surface of the outer circumferential wall of the casing cover toward the casing-cover-side outer circumferential surface of the stator core.

According to a ninth aspect of the invention, in the electric motor according to any one of the second through eighth aspects of the invention, the stator core is fastened to the bottom wall of the casing through a plurality of screw bolts that pass through the stator core in an axial direction parallel with the axis about which the rotor is to be rotated.

According to the first or second aspect of the invention, the vehicle electric motor comprises: the tubular-shaped stator core constituted by electromagnetic steel sheets that are laminated on each other; the rotor disposed inside the stator core so as to be rotated about an axis; and the housing storing therein the tubular-shaped stator core and the rotor, and including the circumferential wall and axially opposite end walls that are opposed to each other in the direction parallel with the axis, wherein the stator core is fixed at one of the axially end portions thereof to one of the axially opposite end walls of the housing, and wherein the housing includes the stator-core-inclination restraining portion that protrudes from an inner circumferential surface of the circumferential wall of the housing toward the part of the outer circumferential surface of the stator core which is located on the side of the other of the axially end portions of the stator core. Owing to the construction, the above-described part of the outer circumferential surface of the stator core is limited from being displaced in a direction perpendicular to the axis (about which the rotor is to be rotated), by the stator-core-inclination restraining portion, so that it is possible to restrain inclination of the stator core.

According to the third aspect of the invention, the casing includes the stator-core positioning portion that protrudes from the inner circumferential surface of the outer circumferential wall of the casing toward the casing-side outer circumferential surface of the stator core, wherein the casing-side outer circumferential surface is a part of the outer circumferential surface of the stator core which is located on the side of the casing. Owing to the construction, when the stator core is to be fastened to the casing, it is possible to easily position the stator core in a predetermined position relative to the casing-side end portion of the stator core.

According to the fourth aspect of the invention, the stator core includes an overlapping portion that overlaps with the stator-core-inclination restraining portion in a direction perpendicular to the axis about which the rotor is to be rotated, wherein the overlapping portion of the stator core has a length measured in an axial direction parallel with the axis while the engagement established by the positioning engagement mechanism has a length measured in the axial direction, such that the length of the overlapping portion of the stator core is shorter than the length of the engagement, with the mating surface of the casing and the mating surface of the casing cover being in contact with each other. Thus, when the cover is to be attached to the casing to which the stator core is already fixed, the positioning engagement mechanism starts to establish the above-described engagement before the stator-core-inclination restraining portion becomes to overlap with the stator core in the direction perpendicular to the axis. Therefore, owing to the construction, when the cover is to be attached to the casing, the stator-core-inclination restraining portion can be prevented from being brought into contact with the stator core, so that the cover can be easily attached to the casing.

According to the fifth aspect of the invention, the stator-core-inclination restraining portion and the casing-cover-side outer circumferential surface of the stator core are spaced apart from each other by a first distance measured in a direction perpendicular to the axis about which the rotor is to be rotated, wherein a casing-cover-side inner circumferential surface of the stator core and a casing-cover-side outer circumferential surface of the rotor are spaced apart from each other by a fourth distance measured in the direction perpendicular to the axis, the casing-cover-side inner circumferential surface of the stator core being a part of an inner circumferential surface of the stator core which is located on a side of the casing cover, the casing-cover-side outer circumferential surface of the rotor being a part of an outer circumferential surface of the rotor which is located on a side of the casing cover, and wherein the first distance is shorter than the fourth distance. Owing to this construction, it is possible to reduce a probability of interference of the stator core and the rotor with each other.

According to the sixth aspect of the invention, the stator-core-inclination restraining portion and the casing-cover-side outer circumferential surface of the stator core are spaced apart from each other by a first distance measured in a direction perpendicular to the axis about which the rotor is to be rotated, wherein the inner circumferential surface of the outer circumferential wall of the casing cover and the casing-cover-side outer circumferential surface of the stator core are spaced apart from each other by a second distance measured in the direction perpendicular to the axis, wherein an inner circumferential surface of the outer circumferential wall of the casing and a casing-side outer circumferential surface of the stator core are spaced apart from each other by a third distance measured in the direction perpendicular to the axis, the casing-side outer circumferential surface being a part of the outer circumferential surface of the stator core which is located on a side of the casing, and wherein the first distance is shorter than the second distance and the third distance. Owing to the construction, the casing-cover-side outer circumferential surface of the stator core is limited from being displaced in the direction perpendicular to the axis by the stator-core-inclination restraining portion, so that it is possible to restrain the stator core from being excessively inclined.

According to the seventh aspect of the invention, the mating surface of the casing and the mating surface of the casing cover, which are in contact with each other, are located in respective positions that overlap with the stator core in a direction perpendicular to the axis about which the rotor is to be rotated. Owing to this construction, an axial length of each of the casing cover and the casing, which is measured in a diction parallel with the axis, can be reduced whereby the casing cover can be easily attached to the casing.

According to the eighth aspect of the invention, the stator-core-inclination restraining portion is a protruding portion which is integrally formed with the casing cover and which protrudes from the inner circumferential surface of the outer circumferential wall of the casing cover toward the casing-cover-side outer circumferential surface of the stator core. Owing to this construction, the casing-cover-side outer circumferential surface of the stator core is limited from being displaced in the direction perpendicular to the axis by the stator-core-inclination restraining portion, so that it is possible to restrain the stator core from being excessively inclined.

According to the ninth aspect of the invention, the stator core is fastened to the bottom wall of the casing through the plurality of screw bolts that pass through the stator core in an axial direction parallel with the axis about which the rotor is to be rotated. Owing to the construction, since the stator core is fastened to the bottom wall of the casing through the plurality of screw bolts, it is possible to restrain excessively large displacement of a cover-side portion of the stator core which is located on a side of the casing cover, in a direction perpendicular to the axis, when the stator core is inclined.

DETAILED DESCRIPTION OF PREFERRED EMBODIMENTS

Hereinafter, some embodiments of the invention will be described in detail with reference to the accompanying drawings. It is noted that figures of the drawings are simplified or deformed as needed, and each portion is not necessarily precisely depicted in terms of dimension ratio, shape, etc.

First Embodiment

Figure 1:
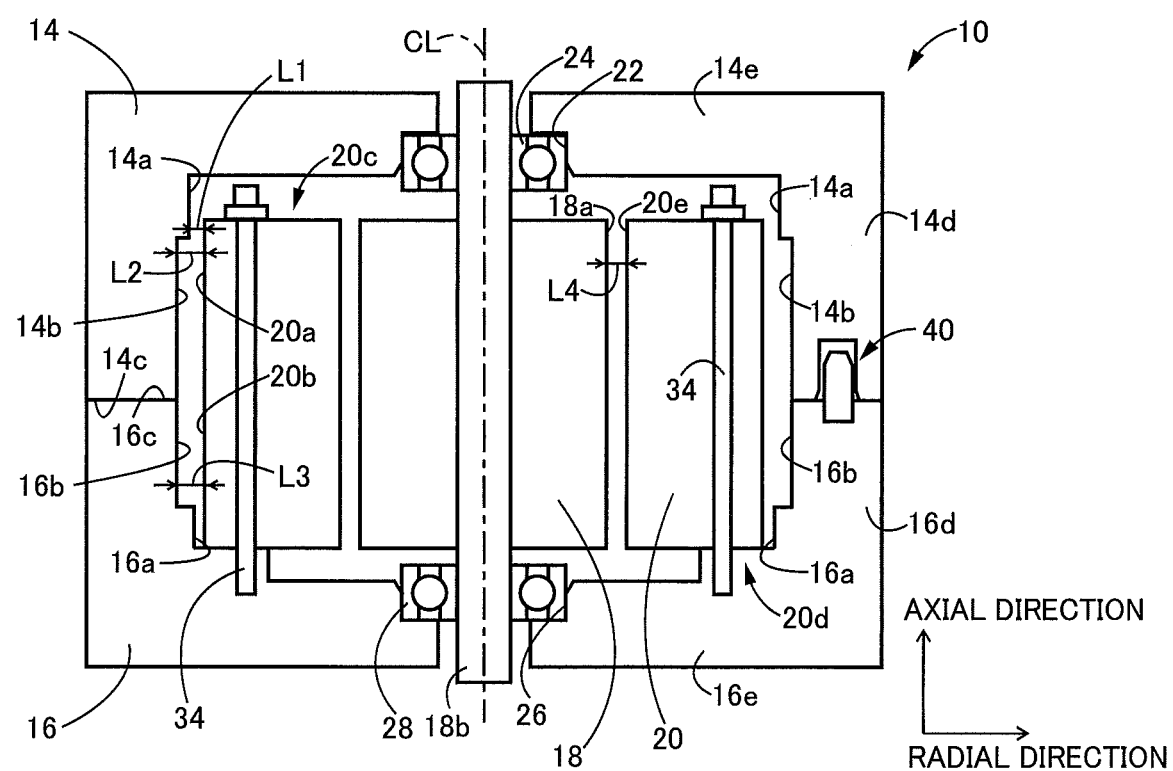
FIG. 1 is a view schematically showing a vehicle electric motor to which the present invention is applied, wherein the view corresponds to a cross sectional view taken in a plane containing an axis CL about which a rotor of the electric motor is to be rotated.

FIG. 1 is a view schematically showing a vehicle electric motor 10 constructed according to a first embodiment of the present invention, wherein the view corresponds to a cross sectional view taken in a plane containing an axis (centerline) CL about which a rotor 18 of the electric motor 10 to be rotated. As shown in FIG. 1, the electric motor 10 includes, in addition to the rotor 18, a casing cover 14, a casing 16 and a stator core 20 on which a coil 19 (see FIG. 2) is wound. The cover 14 has a generally cylindrical shape, and includes a bottom wall 14e and an outer circumferential wall 14d that extends axially from the bottom wall 14e. The bottom wall 14e has a bearing-fitting hole 22 in which a bearing 24 is fitted. The casing 16 has a generally cylindrical shape, and includes a bottom wall 16e and an outer circumferential wall 16d that extends axially from the bottom wall 16e. The bottom wall 16e has a bearing-fitting hole 26 in which a bearing 28 is fitted. The electric motor 10 constructed as described above is an AC synchronous motor in which the rotor 18 storing therein a permanent magnet is rotated owing to a rotating magnetic field that is formed by supply of 3-phase AC current to the coil 19. It is noted that "RADIAL DIRECTION" indicated in the drawing figures represents a direction perpendicular to the above-described axis CL about which the rotor 18 is to be rotated and that "AXIAL DIRECTION" indicated in the drawing figures represents a direction parallel with the axis CL. In the first embodiment, the casing 16 and the cover 14 cooperate with each other to constitute "housing" recited in the appended claims.

Figure 2:
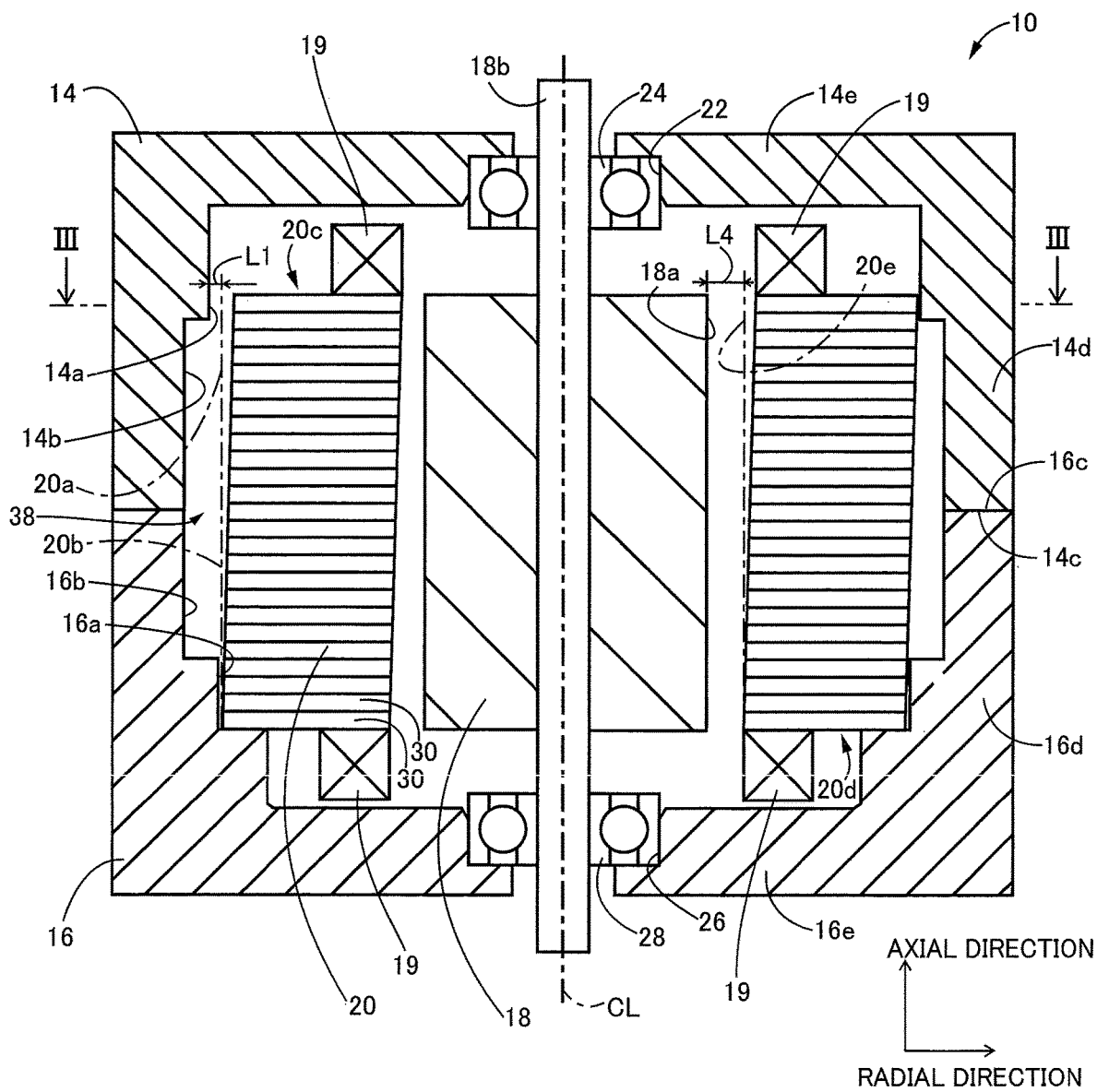
FIG. 2 is a view schematically showing the vehicle electric motor of FIG. 1 when the stator core is inclined.

As shown in FIG. 2, inside the casing 16, the stator core 20 is disposed with a spacing 38 between the stator core 20 and the casing 16 in the radial direction. The spacing 38 extends in a direction perpendicular to the axis CL. The stator core 20 has a generally tubular shape, and is constituted by a plurality of electromagnetic steel sheets 30 (see FIG. 2) that are laminated on each other. Each of the electromagnetic steel sheets 30 is covered with an electrically insulated layer in the form of an oxide film, such that the electromagnetic steel sheets 30 are electrically insulated from one another. The stator core 20 is fixed at its casing-side end portion 20d to the casing 16 through a plurality of screw bolts 34 which pass through the stator core 20 in the axial direction, i.e., the direction parallel with the axis CL (about which the rotor 18 is to be rotated) and which is screwed in the bottom wall 16e of the casing 16. The rotor 18 includes a rotary shaft 18b which is supported by the cover 14 and the casing 16 through the bearings 24, 28, such that the rotor 18 is rotatable about the axis CL. It is noted that a casing-cover side end portion 20c of the stator core 20 is not fixed directly to the cover 14 and the casing 16. Thus, the stator core 20 is supported only at the casing-side end portion 20d that is fixed directly to the bottom wall 16e of the casing 16. That is, the stator core 20 is supported by the casing 16 in a cantilever manner.

Figure 3:
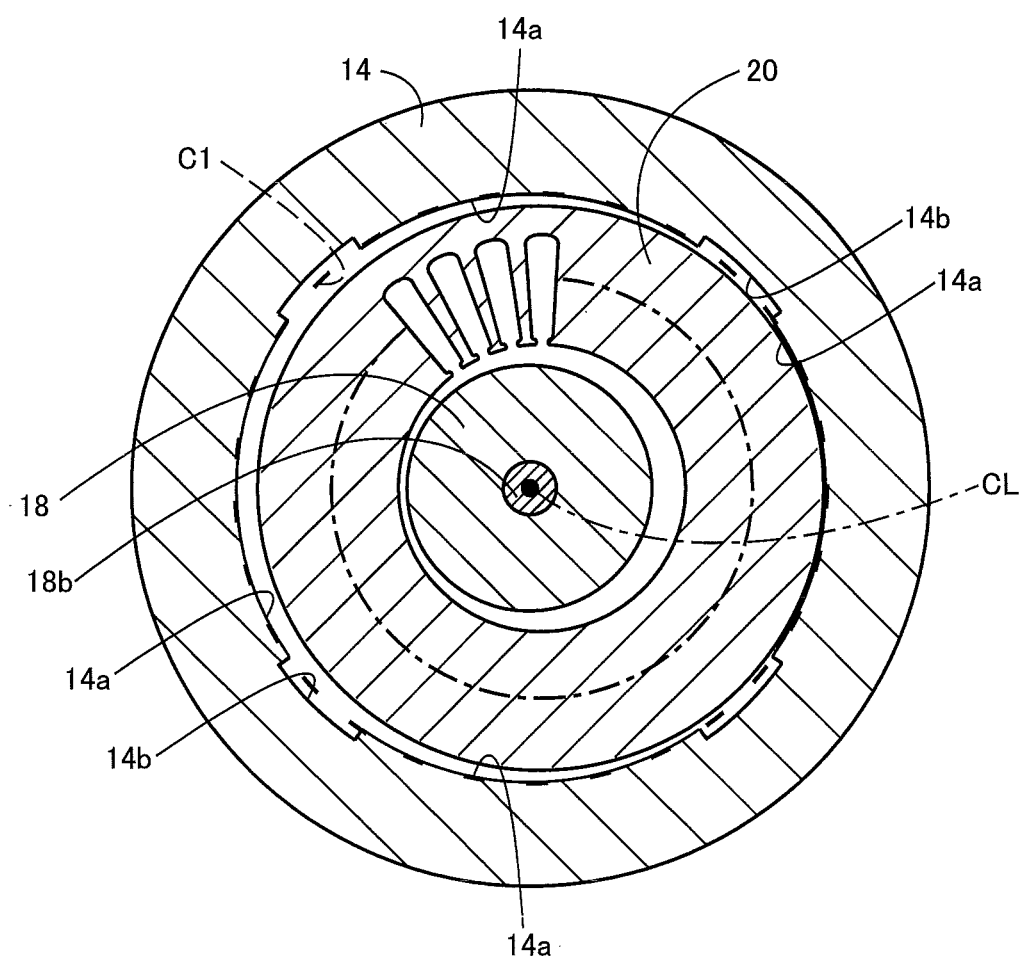
FIG. 3 is a cross sectional view taken along line III-III indicated in FIG. 2.

FIG. 2 is a view schematically showing the electric motor 10 when the stator core 20 is inclined. FIG. 3 is a cross sectional view taken along line indicated in FIG. 2. It is noted that the plurality of screw bolts 34 are not shown in FIGS. 2 and 3. It is further noted that, although the stator core 20 has a plurality of slots which extend radially outwardly from an inner circumferential surface of the stator core 20 and which are circumferentially equi-angularly arranged along an entire circumference of the inner circumferential surface, only four of the plurality of slots are shown in FIG. 3. The cover 14 is provided with a stator-core-inclination restraining portion 14a that protrudes from an inner circumferential surface 14b of the outer circumferential wall 14d toward a casing-cover-side outer circumferential surface 20a of the stator core 20, which is located on a side of the cover 14. The stator-core-inclination restraining portion 14a corresponds to "protruding portion" recited in the appended claims. The casing 16 is provided with a stator-core positioning portion 16a that protrudes from an inner circumferential surface 16b of the outer circumferential wall 16d toward a casing-side outer circumferential surface 20b of the stator core 20, which is located on a side of the casing 16. The stator-core positioning portion 16a corresponds to a protruding portion of the casing 16. The stator-core positioning portion 16a is the protruding portion by which the casing-side end portion 20d of the stator core 20 is positioned in a predetermined position relative to the bottom wall 16e of the casing 16 before the stator core 20 is fastened to the casing 16 through the plurality of screw bolts 34. As shown in FIG. 3, the stator-core-inclination restraining portion 14a consists of four protrusions which are provided on the inner circumference surface 14b of the cover 14 and which are circumferentially equi-angularly arranged on a circle Cl whose center lies on the axis CL. Similarly, the stator-core positioning portion 16a consists of four protrusions which are provided on the inner circumference surface 16b of the casing 16 and which are circumferentially equi-angularly arranged on a circle whose center lies on the axis CL.

As shown in FIG. 2, when the stator core 20 is inclined, the stator core 20 is brought into contact at the casing-cover-side outer circumferential surface 20a with the stator-core-inclination restraining portion 14a provided in the cover 14. Thus, the casing-cover-side outer circumferential surface 20a of the stator core 20 is limited from being displaced in any direction perpendicular to the axis CL whereby the stator core 20 can be impeded from being further inclined. Further, the stator-core positioning portion 16a is provided such that, when the stator core 20 is inclined, the stator core 20 is brought into contact at the casing-side end portion 20d with the stator-core positioning portion 16a, whereby the inclination of the stator core 20 can be impeded by the stator-core positioning portion 16a in addition to the stator-core-inclination restraining portion 14a.

Referring back to FIG. 1, reference sign "L1" represents a first distance between the stator-core-inclination restraining portion 14a provided in the cover 14 and the casing-cover-side outer circumferential surface 20a of the stator core 20 in the radial direction (i.e., direction perpendicular to the axis CL), reference sign "L2" represents a second distance between the inner circumferential surface 14b of the outer circumferential wall 14d of the cover 14 and the casing-cover-side outer circumferential surface 20a of the stator core 20 in the radial direction (i.e., direction perpendicular to the axis CL), and reference sign "L3" represents a third distance between the inner circumferential surface 16b of the outer circumferential wall 16d of the casing 16 and the casing-side outer circumferential surface 20b of the stator core 20 in the radial direction (i.e., direction perpendicular to the axis CL). When the stator core 20 is not inclined, the first distance L1 is shorter than the second distance L2 and the third distance L3.

Further, as shown in FIGS. 1 and 2, when the stator core 20 is not inclined, the above-described first distance L1 is shorter than a fourth distance L4 that is a distance between a casing-cover-side inner circumferential surface 20e of the stator core 20 and a casing-cover-side outer circumferential surface 18a of the rotor 18 in the radial direction (i.e., direction perpendicular to the axis CL).

Figure 8:
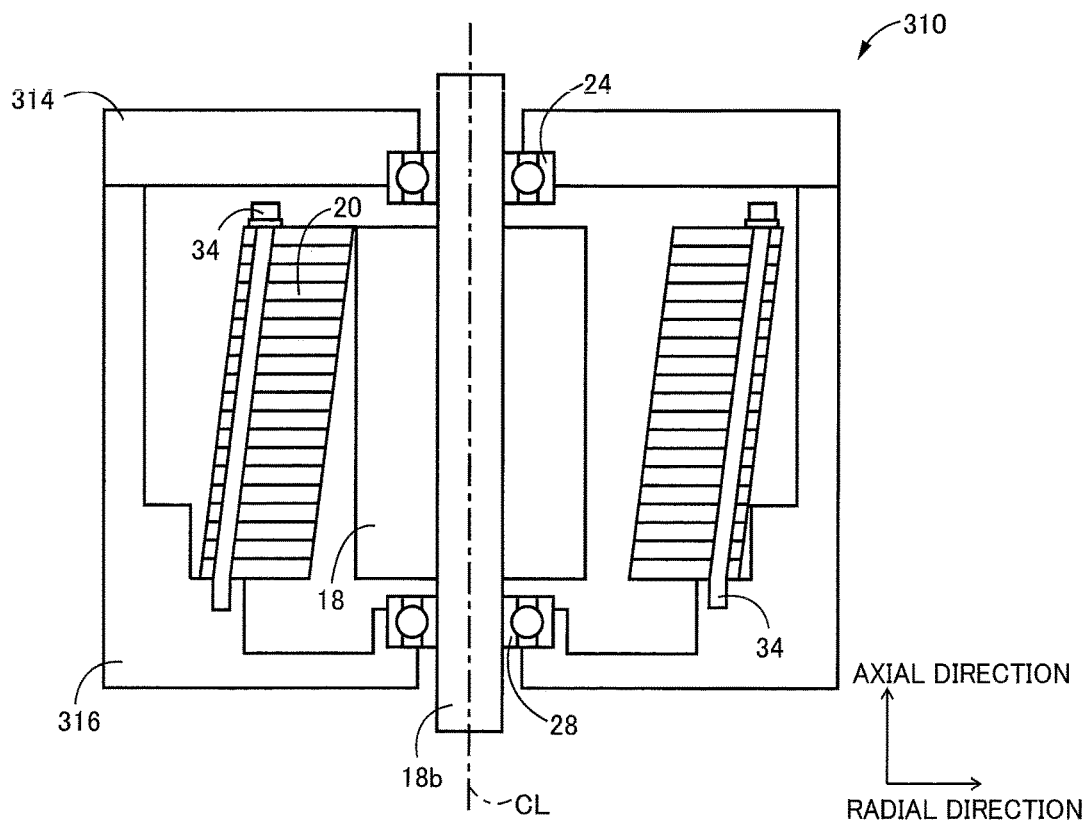
FIG. 8 is a cross sectional view schematically showing a comparative example of a vehicle electric motor in which a stator-core-inclination restraining portion is not provided.

FIG. 8 is a view showing, as a comparative example, an electric motor 310 including a casing cover 314 that is not provided with a stator-core-inclination restraining portion, when the stator core 20 is inclined. As shown in FIG. 8, in the electric motor 310, the stator core 20 is fixed directly to a bottom wall of a casing 316 through the plurality of screw bolts 34, but is not fixed directly to the cover 314. Therefore, for example, when the stator core 20 is to be fastened to the casing 316 through the screw bolts 34, there is a probability that the stator core 20 would be inclined in a certain direction, due to force applied to assemble the electric motor 310 or fasten the stator core 20 to the casing 316 and/or due to variation of a thickness of each of the electromagnetic steel sheets laminated on each other. Further, particularly, where the electric motor 310 is disposed to lie horizontally with the axis CL extending in a horizontal direction, the stator core 20 could be inclined because the stator core 20 is supported in a cantilever manner only by the casing 316. Moreover, when an electromagnetic force is large or when the electric motor 310 is caused to shake by vibration caused by vibration, shock or other external force applied during running of the vehicle, the stator core 20 could be bent so as to be inclined. For example, if these inclinations are combined with each other, relatively large inclination of the stator core 20 would be caused whereby the casing-cover-side inner circumferential surface of the stator core 20 would be displaced toward the casing-cover-side outer circumferential surface of the rotor 18 on the side of the cover 314, thereby causing a risk that the stator core 20 would be excessively close to the rotor 18 or would be brought into contact with the rotor 18 in the electric motor 310. It is considered that the excessively large inclination of the stator core 20 would be more likely to be caused, particularly, where the axial length of the stator core 20 is large, the diameter of the stator core 20 is small and the axial length of the stator-core positioning portion of the casing is small.

However, in the present embodiment, as shown in FIGS. 1 and 2, when the stator core 20 is not inclined, the first distance L1 between the stator-core-inclination restraining portion 14a and the casing-cover-side outer circumferential surface 20a of the stator core 20 is shorter than the fourth distance L4 between the casing-cover-side inner circumferential surface 20e of the stator core 20 and the casing-cover-side outer circumferential surface 18a of the rotor 18. Therefore, before the stator core 20 is brought into contact with the rotor 18, the stator core 20 is brought into contact at the casing-cover-side outer circumferential surface 20a with the stator-core-inclination restraining portion 14a, so that it is possible to reduce the risk of the contact of the stator core 20 with the rotor 18 due to excessively large inclination of the stator core 20.

Figure 4:
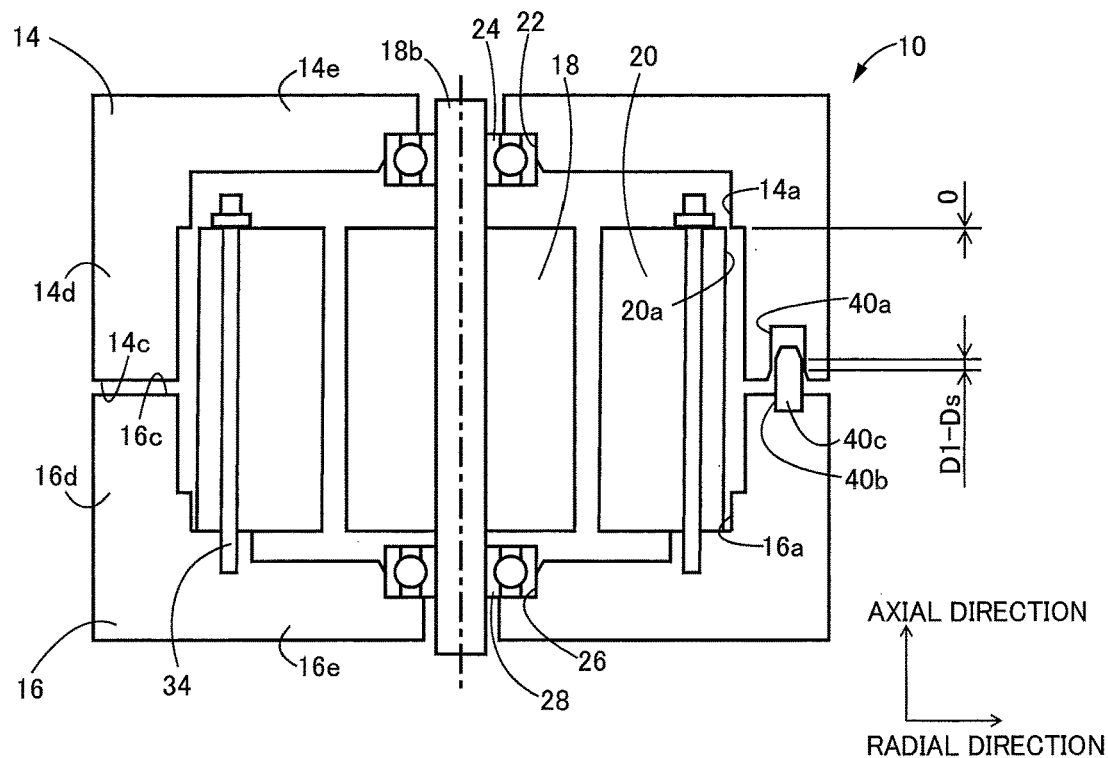
FIG. 4 is a view schematically showing the vehicle electric motor of FIG. 1 in its manufacturing process, specifically, in a step of positioning a casing cover relative to a casing so as to attach the casing cover to the casing.
Figure 5:
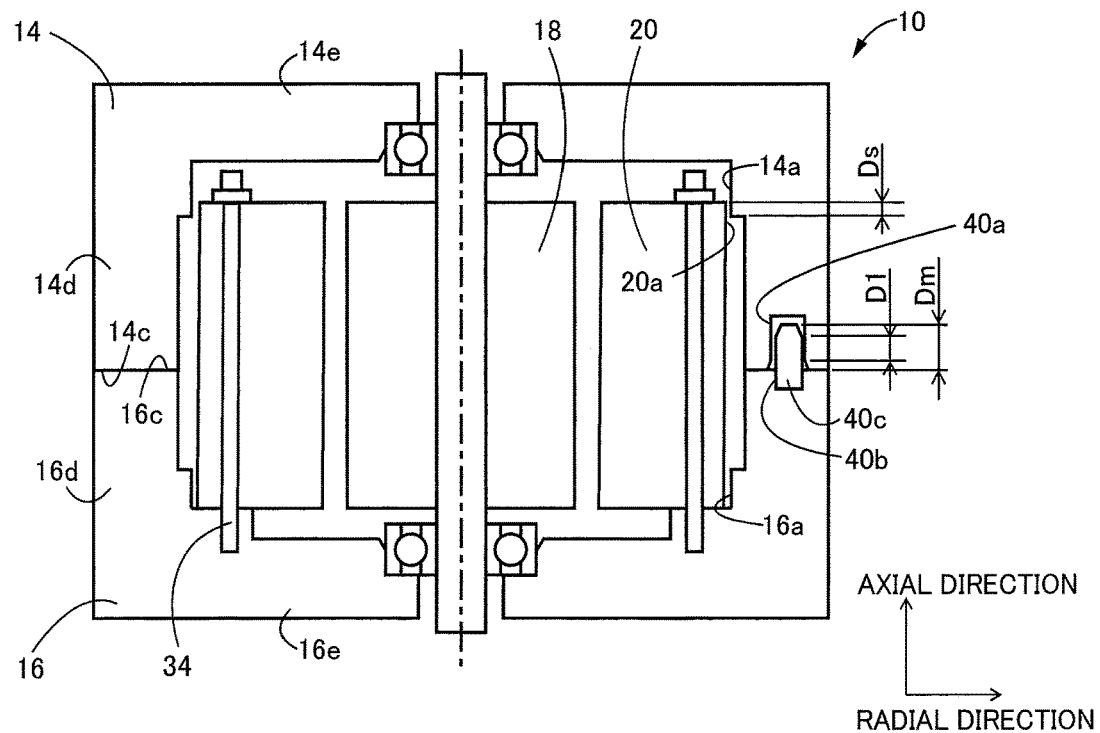
FIG. 5 is a view schematically showing the vehicle electric motor of FIG. 1 when the casing cover has been attached to the casing at the step shown in FIG. 4.

FIG. 4 is a view showing the electric motor 10 its manufacturing process, specifically, in a step of positioning the cover 14 relative to the casing 16 so as to attach the cover 14 to the casing 16. FIG. 5 is a view showing the electric motor 10 when the cover 14 has been attached to the casing 16 at the step shown in FIG. 4. As s shown in FIG. 4, the outer circumferential wall 14d of the cover 14 has a distal end surface that serves as a mating surface 14c, while the outer circumferential wall 16d of the casing 16 has a distal end surface that serves as a mating surface 16c. The mating surfaces 14c, 16c are provided in the cover 14 and the casing 16, respectively, such that the mating surfaces 14c, 16c are located in respective positions that overlap with the stator core 20 in the radial direction, i.e., in the direction perpendicular to the axis CL when the mating surfaces 14c, 16c are in contact with each other.

The mating surface 14c of the cover 14 is provided with a plurality of positioning holes 40a by which the cover 14 is positioned in the predetermined position relative to the casing 16. The mating surface 16c of the casing 16 is provided with a plurality of positioning holes 40b which extend in the axial direction, i.e., in the direction parallel with the axis CL and which receive respective positioning pins 40c therein.

As shown in FIG. 4, each one of the positioning pins 40 received in the respective positioning holes 40b is fitted in a corresponding one of the positioning holes 40a, such that the cover 14 is positioned in the predetermined position relative to the casing 16 whereby the inner circumferential surface 14b of the outer circumferential wall 14d of the cover 14 and the inner circumferential surface 16b of the outer circumferential wall 16d of the casing 16 are made coaxial with each other. When the inner circumferential surfaces 14b, 16b are coaxial with each other, centers of the respective inner circumferential surfaces 14b, 16b are coincident with the above-described axis CL about which the rotor 18 is to be rotated. In the present embodiment, the positioning holes 40a, 40b of the respective cover 14 and casing 16 and the positioning pins 40c cooperate to constitute a fitting or positioning engagement mechanism 40.

When the cover 14 is to be fastened to the casing 16 in a process of manufacturing the electric motor 10, the stator core 20 is first moved along the stator-core positioning portion 16a serving as a guide, so as to be positioned in a predetermined position relative to the bottom wall 16e of the casing 16, and then the stator core 20 is fastened to the casing 16 through the plurality of screw bolts 34. After the stator core 20 has been fixed to the casing 16, the rotary shaft 18b of the rotor 18 is caused to pass through an inner hole of the bearing 28 fitted in the bearing-fitting hole 26 of the casing 16, whereby the rotor 18 is disposed radially inside the stator core 20 that is fixed to the casing 16. Then, the rotary shaft 18b of the rotor 18 is introduced into an inner hole of the bearing 24 fitted in the bearing-fitting hole 22 of the cover 14, and the cover 14 is positioned in a predetermined position relative to the casing 16 by the positioning engagement mechanism 40. After the mating surface 14c of the cover 14 has been brought into contact with the mating surface 16c of the casing 16, as shown in FIG. 5, the cover 14 is fixed to the casing 16 through suitable fasteners (not shown) such as screw bolts or the like.

Thus, the positioning engagement mechanism 40 establishes an engagement by which the casing 16 and the cover 14 are positioned relative to each other with the mating surface 16c of the casing 16 and the mating surface 14c of the cover 14 being in contact with each other. The engagement established by the positioning engagement mechanism 40 has an engagement length D1 measured in the axial direction (i.e., direction parallel with the axis CL), as shown in FIG. 5. The engagement length D1 is a distance for which the cover 14 is moved relative to the casing 16 when the cover 14 is to be fastened to the casing 16. Specifically, the engagement length D1 is the distance for which the cover 14 is moved relative to the casing 16 from an engagement starting position in which an outer circumferential surface of each of the positioning pins 40c starts to be in contact with an inner circumferential surface of a corresponding one of the positioning holes 40a, to an engagement completing position in which the engagements of the positioning pins 40c with the respective positioning holes 40a are completed by the contact of the mating surface 14c with the mating surface 16c. It is noted that the above-described outer circumferential surface of each positioning pin 40c does not include a chamfered portion of each positioning pin 40c, and that the above-described inner circumferential surface of each positioning hole 40a does not include a chamfered portion of each positioning hole 40a. Therefore, the engagement length D1 is interpreted to correspond to a length obtained by subtracting an axial length of the chamfered portion of each positioning hole 40a and an axial length of the chamfered portion of each positioning pin 40c from an introduced length Dm for which each positioning pin 40c is introduced in the corresponding positioning hole 40a, as shown in FIG. 5.

The stator-core-inclination restraining portion 14a is a protruding portion which is integrally formed with the cover 14 and which protrudes from the inner circumferential surface 14b of the outer circumferential wall 14d of the cover 14 toward the casing-cover-side outer circumferential surface 20a of the stator core 20. Therefore, when the cover 14 is to be fastened to the casing 16, the stator-core-inclination restraining portion 14a could be brought into contact with the casing-cover-side outer circumferential surface 20a of the stator 20, due to assembling error and dimensional variation. Thus, in order to reduce a probability of the contact of the stator-core-inclination restraining portion 14a with the casing-cover-side outer circumferential surface 20a, a length Ds (see FIG. 5) is made shorter than the above-described engagement length D1, wherein the length Ds is a length of an overlapping portion of the stator core 20 which overlaps with the stator-core-inclination restraining portion 14a in the radial direction and is measured in the axial direction, i.e., the direction parallel with the axis CL.

FIG. 4 shows a stage before the mating surfaces 14c, 16c of the respective cover 14 and casing 16 are brought into contact with each other, more precisely, shortly before the stator core 20 overlaps the stator-core-inclination restraining portion 14a in the radial direction. That is, in the stage shown in FIG. 4, a distance between stator-core-inclination restraining portion 14a and the above-described overlapping portion of the stator core 20 is zero in the axial direction. In this stage shown in FIG. 4, the outer circumferential surface of each positioning pin 40c and the inner circumferential surface of the corresponding positioning hole 40a already overlap with each other by a distance that is represented by D1-Ds, so that the cover 14 is already positioned in the predetermined position relative to the casing 16, thereby reducing the probability of the contact of the stator-core-inclination restraining portion 14a with the casing-cover-side outer circumferential surface 20a.

As described above, in the present embodiment, the vehicle electric motor 10 includes the tubular-shaped stator core 20 constituted by the electromagnetic steel sheets 30 laminated on each other, the rotor 18 disposed inside the stator core 20 so as to be rotated about an axis CL, and the housing storing therein the tubular-shaped stator core 20 and the rotor 18 and including a circumferential wall and axially opposite end walls that are opposed to each other in the axial direction. The housing is constituted by the casing 16 and the cover 14 that are fixed to each other. The casing 16 includes the outer circumferential wall 16d that is a part of the circumferential wall of the housing, the bottom wall 16e that is one of the axially opposite end walls of the housing, and the mating surface 16c that is provided by a distal end surface of the outer circumferential wall 16d of the casing 16 or provided in vicinity of the outer circumferential wall 16d of the casing 16. The cover 14 includes the outer circumferential wall 14d that is another part of the circumferential wall of the housing, the bottom wall 14e that is the other of the axially opposite end walls of the housing, and a mating surface 14c that is provided by a distal end surface of the outer circumferential wall 14d of the cover 14 or provided in vicinity of the outer circumferential wall 14d of the cover 14. The stator core 20 is fixed at its casing-side end portion 20d to the bottom wall 16e of the casing 16. The casing 16 and the cover 14 are fixed to each other, with the mating surface 16c of the casing 16 and the mating surface 14c of the cover 14 being in contact with each other. The vehicle electric motor 10 includes the positioning engagement mechanism 40 establishing the engagement by which the casing 16 and the cover 14 are positioned relative to each other with the mating surface 16c of the casing 16 and the mating surface 14c of the cover 14 being in contact with each other such that the inner circumferential surface 16b of the outer circumferential wall 16d of the casing 16 and the inner circumferential surface 14b of the outer circumferential wall 14d of the cover 14 are coaxial with each other. The stator-core-inclination restraining portion 14a is provided to protrude from the inner circumferential surface 14b of the outer circumferential wall 14d of the cover 14, toward the casing-cover-side outer circumferential surface 20a of the stator core 20. Owing to the construction, the casing-cover-side outer circumferential surface 20a of the stator core 20 is limited from being displaced in the direction perpendicular to the axis CL by the stator-core-inclination restraining portion 14a, so that it is possible to restrain the stator core 20 from being excessively inclined.

In the present embodiment, the casing 16 includes the stator-core positioning portion 16a that protrudes from the inner circumferential surface 16b of the outer circumferential wall 16d of the casing 16 toward the casing-side outer circumferential surface 20b of the stator core 20, wherein the casing-side outer circumferential surface 20b is a part of the outer circumferential surface of the stator core 20 which is located on the side of the casing 16. Owing to the construction, when the stator core 20 is to be fastened to the casing 16, it is possible to easily position the stator core 20 in a predetermined position relative to the casing-side end portion 20d of the stator core 20.

In the present embodiment, the stator core 20 includes the overlapping portion that overlaps with the stator-core-inclination restraining portion 14a in a direction perpendicular to the axis CL about which the rotor 18 is to be rotated, wherein the overlapping portion of the stator core 20 has the length Ds measured in the axial direction parallel with the axis CL while the engagement established by the positioning engagement mechanism 40 has the engagement length D1 measured in the axial direction, such that the length Ds of the overlapping portion of the stator core 20 is shorter than the engagement length D1, with the mating surface 16e of the casing 16 and the mating surface 14e of the cover 14 being in contact with each other. Thus, when the cover 14 is to be attached to the casing 16 to which the stator core 20 is already fixed, the positioning engagement mechanism 40 starts to establish the above-described engagement before the stator-core-inclination restraining portion 14a becomes to overlap with the stator core 20 in the direction perpendicular to the axis CL. Therefore, owing to the construction, when the cover 14 is to be attached to the casing 16, the stator-core-inclination restraining portion 14a can be prevented from being brought into contact with the stator core 20, so that the cover 14 can be easily attached to the casing 16.

In the present embodiment, the stator-core-inclination restraining portion 14a and the casing-cover-side outer circumferential surface 20a of the stator core 20 are spaced apart from each other by the first distance L1 measured in a direction perpendicular to the axis CL about which the rotor 18 is to be rotated, wherein the casing-cover-side inner circumferential surface 20e of the stator core 20 and the casing-cover-side outer circumferential surface 18a of the rotor 18 are spaced apart from each other by the fourth distance L4 measured in the direction perpendicular to the axis, and wherein the first distance L1 is shorter than the fourth distance L4. Owing to this construction, it is possible to reduce a probability of interference of the stator core 20 and the rotor 18 with each other.

In the present embodiment, the stator-core-inclination restraining portion 14a and the casing-cover-side outer circumferential surface 20a of the stator core 20 are spaced apart from each other by the first distance L1 measured in a direction perpendicular to the axis CL about which the rotor 18 is to be rotated, wherein the inner circumferential surface 14b of the outer circumferential wall 14d of the cover 14 and the casing-cover-side outer circumferential surface 20a of the stator core 20 are spaced apart from each other by the second distance L2 measured in the direction perpendicular to the axis CL, wherein the inner circumferential surface 16b of the outer circumferential wall 16d of the casing 16 and the casing-side outer circumferential surface 20b of the stator core 20 are spaced apart from each other by the third distance L3 measured in the direction perpendicular to the axis CL, and wherein the first distance L1 is shorter than the second distance L2 and the third distance L3. Owing to the construction, the casing-cover-side outer circumferential surface 20a of the stator core 20 is limited from being displaced in the direction perpendicular to the axis CL by the stator-core-inclination restraining portion 14a, so that it is possible to restrain the stator core 20 from being excessively inclined.

In the present embodiment, the mating surface 16c of the casing 16 and the mating surface 14c of the cover 14, which are in contact with each other, are located in respective positions that overlap with the stator core 20 in a direction perpendicular to the axis CL about which the rotor 18 is to be rotated. Owing to this construction, an axial length of each of the cover 14 and the casing 16, which is measured in a diction parallel with the axis CL, can be reduced whereby the cover 14 can be easily attached to the casing 16.

In the present embodiment, the stator-core-inclination restraining portion 14a is a protruding portion which is integrally formed with the cover 14 and which protrudes from the inner circumferential surface 14b of the outer circumferential wall 14d of the cover 14 toward the casing-cover-side outer circumferential surface 20a of the stator core 20. Owing to this construction, the casing-cover-side outer circumferential surface 20a of the stator core 20 is limited from being displaced in the direction perpendicular to the axis CL by the stator-core-inclination restraining portion 14a, so that it is possible to restrain the stator core 20 from being excessively inclined.

In the present embodiment, the stator core 20 is fastened to the bottom wall 16e of the casing 16 through the plurality of screw bolts 34 that pass through the stator core 20 in an axial direction parallel with the axis CL about which the rotor 18 is to be rotated. Owing to the construction, since the stator core. 20 is fastened to the bottom wall 16e of the casing 16 through the plurality of screw bolts 34, it is possible to restrain excessively large displacement of a cover-side portion of the stator core 20 which is located on a side of the cover 14, in a direction perpendicular to the axis CL, when the stator core 20 is inclined.

There will be described other embodiments of this invention. The same reference signs as used in the above-described embodiment will be used in the following embodiments, to identify the functionally corresponding elements, and descriptions thereof are not provided.

Second Embodiment

Figure 6:
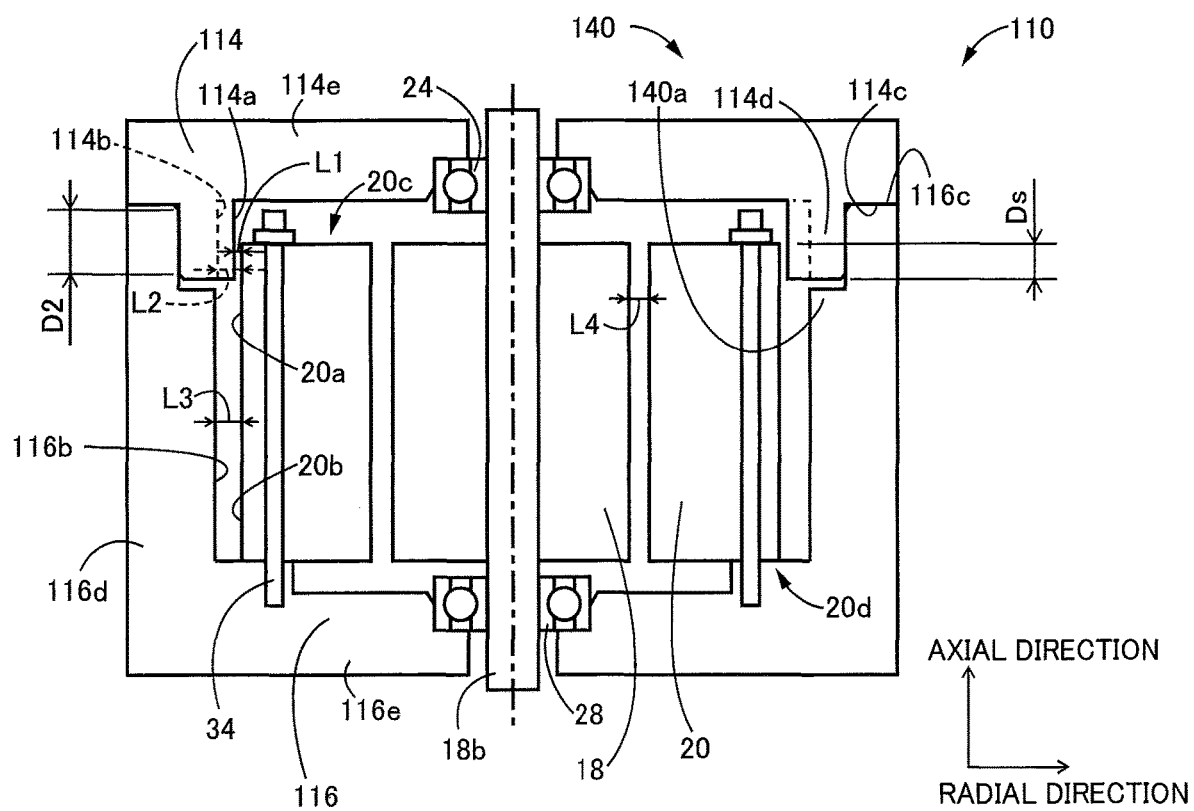
FIG. 6 is a view schematically showing another embodiment of the vehicle electric motor, and corresponding to FIG. 1.

FIG. 6 is a view corresponding to FIG. 1 and schematically showing a vehicle electric motor 110 constructed according to the second embodiment of the present invention. As shown in FIG. 6, a casing cover 114 of the electric motor 110 has a generally cylindrical shape, and includes a mating surface 114c, a bottom wall 114e and an outer circumferential wall 114d extending axially from a portion of the bottom wall 114e which portion is located radially inside the mating surface 114c. The outer circumferential wall 114d, which extends from the portion of the bottom wall 114e downwardly as seen in FIG. 6, constitutes a tubular-shaped engaging protruding portion. The cover 114 is provided with a stator-core-inclination restraining portion 114a that protrudes from an inner circumferential surface 114b of the outer circumferential wall 114d toward the casing-cover-side outer circumferential surface 20a of the stator core 20. The stator-core-inclination restraining portion 114a corresponds to "protruding portion" recited in the appended claims. The casing 116 has a generally cylindrical shape, and includes a bottom wall 116e and an outer circumferential wall 116d that extends axially from the bottom wall 116e. The outer circumferential wall 116d has a distal end surface that serves as a mating surface 116c, and is provided with a recessed portion 140a that is recessed downwardly from the mating surface 116c as seen in FIG. 6. In this second embodiment, the casing 116 and the cover 114 cooperate with each other to constitute "housing" recited in the appended claims.

When the cover 114 is to be fastened to the casing 116, a side surface of the outer circumferential wall 114d is brought into contact with an inner circumferential surface of the recessed portion 140a, whereby the cover 114 is positioned in a predetermined position relative to the casing 116 such that the inner circumferential surface 114b of the outer circumferential wall 114d of the cover 114 and the inner circumferential surface 116b of the outer circumferential wall 116d of the casing 116 are coaxial with each other. Then, the cover 114 and the casing 116 are fastened to each other through suitable fasteners (not shown) such as screw bolts or the like, while the mating surfaces 114c, 116c are in contact with other. In this second embodiment, the outer circumferential wall 114d of the cover 114 and the recessed portion 140a of the casing 116 cooperate with each other to constitute a positioning engagement mechanism 140 that establishes an engagement by which the casing 116 and the cover 114 are positioned relative to each other. The engagement established by the positioning engagement mechanism 140 has an engagement length D2 measured in the axial direction (i.e., direction parallel with the axis CL), as shown in FIG. 6.

The engagement length D2 is a distance for which the cover 114 is moved relative to the casing 116 when the cover 114 is to be fastened to the casing 116. Specifically, the engagement length D2 is the distance for which the cover 114 is moved relative to the casing 116 from an engagement starting position in which the side surface of the outer circumferential wall 114d starts to be in contact with the inner circumferential surface of the recesses portion 140a, to an engagement completing position in which the engagement of the outer circumferential wall 114d with the recessed portion 140a is completed by the contact of the mating surface 114c of the cover 114 with the mating surface 116c of the casing 116. It is noted that the above-described side surface of the outer circumferential wall 114d does not include a chamfered portion and that the inner circumferential surface of the recessed portion 140a does not include a chamfered portion.

As shown in FIG. 6, a length Ds is shorter than the above-described engagement length D2, wherein the length Ds is a length of the overlapping portion of the stator core 20 which overlaps with the stator-core-inclination restraining portion 114a in the radial direction and is measured in the axial direction, i.e., the direction parallel with the axis CL, with the mating surface 114c of the cover 14 and the mating surface 116c of the casing 116 being in contact with each other. In this second embodiment, too, it is possible to obtain substantially the same technical advantages as in the above-described first embodiment, except the advantage related to the stator-core positioning portion 16a and the advantage related to the arrangement in which the positions of the respective mating surfaces 14c, 16c of the respective cover 14 and casing 16 overlap with the stator core 20 in the radial direction, i.e., the direction perpendicular to the axis CL about which the rotor 18 is to be rotated.

It is noted that, in this second embodiment, a stator-core positioning portion may be additionally provided as in the first embodiment, such that the stator-core positioning portion is provided by at least one protrusion that protrudes radially from the inner circumferential surface 116b of the outer circumferential wall 116d toward the casing-side outer circumferential surface 20b of the stator core 20.

In this second embodiment, the mating surface 116c of the casing 116 and the mating surface 114c of the cover 114, which are in contact with each other, are located in respective positions that do not overlap with the stator core 20 in a direction perpendicular to the axis CL about which the rotor 18 is to be rotated, but are offset toward a side of the cover 114. However, the casing 116 and the cover 114 may be modified such that the positions of the respective mating surfaces 116c, 114c overlap with the stator core 20 in the direction perpendicular to the axis CL.

Third Embodiment

Figure 7:
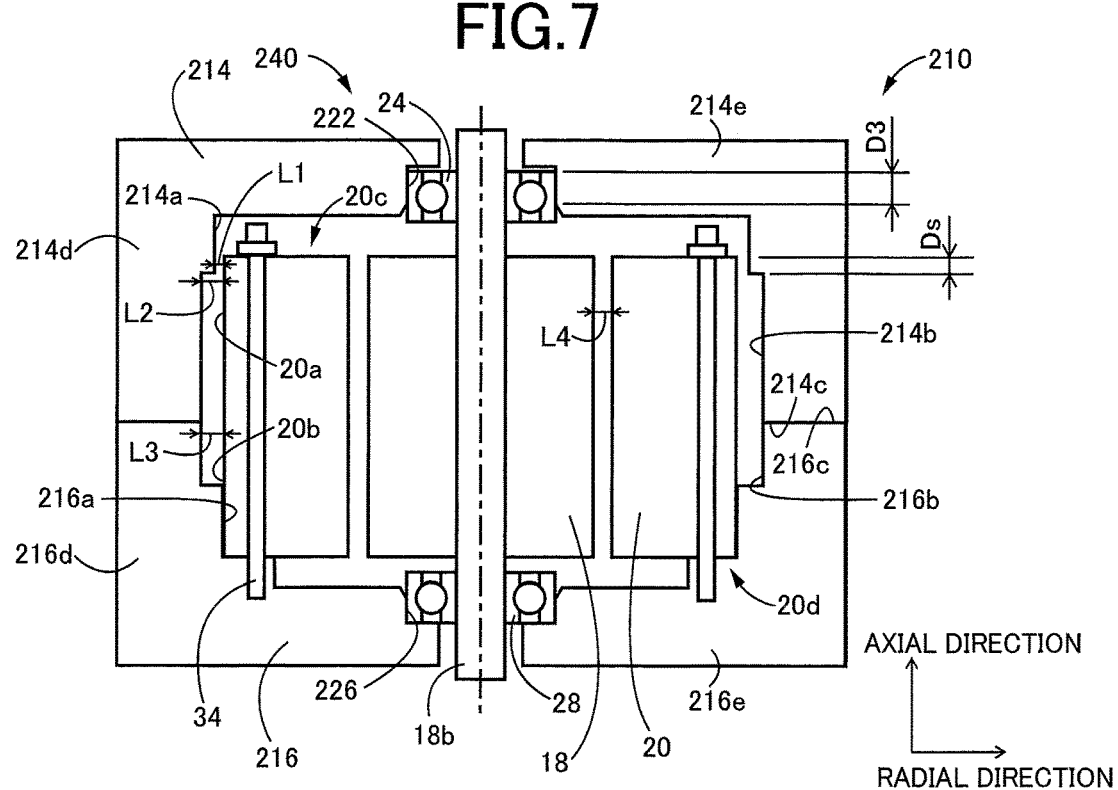
FIG. 7 is a view schematically showing still another embodiment of the vehicle electric motor, and corresponding to FIG. 1.

FIG. 7 is a view corresponding to FIG. 1 and schematically showing a vehicle electric motor 210 constructed according to the third embodiment of the present invention. As shown in FIG. 7, a casing cover 214 of the electric motor 210 has a generally cylindrical shape and includes a bottom wall 214e and an outer circumferential wall 214d extending axially from the bottom wall 214e, while a casing 216 of the electric motor 210 has a generally cylindrical shape and includes a bottom wall 216e and an outer circumferential wall 216d extending axially from the bottom wall 216e. The cover 214 includes a stator-core-inclination restraining portion 214a that is constituted by a protruding portion extending from an inner circumferential surface 214b of an outer circumferential wall 214d of the cover 214 toward the casing-cover-side outer circumferential surface 20a of the stator core 20. Meanwhile, the casing 216 includes a stator-core positioning portion 216a that is constituted by a plurality of protrusions extending from an inner circumferential surface 216b of an outer circumferential wall 216d of the casing 216 toward the casing-side outer circumferential surface 20b of the stator core 20. In the third embodiment, the casing 216 and the cover 214 cooperate with each other to constitute "housing" recited in the appended claims.

In this third embodiment, the bearing-fitting hole 222 of the cover 214 and the bearing 24, which is press-fitted on the rotor 18 on a side of the cover 214, cooperate with each other to constitute a positioning engagement mechanism 240. Specifically described, the rotor 18 is first positioned in a predetermined position relative to the casing 216 in the radial direction (i.e., direction perpendicular to the axis CL), with the bearing 28, which is press-fitted on the rotor 18, being fitted into the bearing-fitting hole 226 of the casing 216. Then, the rotor 18 is positioned in a predetermined position relative to the cover 214 in the radial direction, with the bearing 24, which is press-fitted on the rotor 18 on the side of the cover 214, being fitted into the bearing-fitting hole 222 of the cover 214. In this instance, the bearing 24 is fitted into the bearing-fitting hole 222 of the cover 214, by introducing the bearing 24 into the bearing-fitting hole 222 while sliding an outer circumferential surface of the bearing 24 on an inner circumferential surface of the bearing-fitting hole 222. Thus, the cover 214 is positioned in a predetermined position relative to the casing 216 through the rotor 18, such that the inner circumferential surface 214b of the outer circumferential wall 214d of the cover 214 and the inner circumferential surface 216b of the outer circumferential wall 216d of the casing 216 are coaxial with each other. Then, mating surfaces 214c, 216c of the respective cover 214 and casing 216 are positioned relative to each other, and are brought into contact with each other. Then, the cover 214 and the casing 216 are fastened to each other through suitable fasteners (not shown) such as screw bolts or the like, while the mating surfaces 214c, 216c are in contact with other.

The engagement established by the positioning engagement mechanism 240 has an engagement length D3 measured in the axial direction (i.e., direction parallel with the axis CL), as shown in FIG. 7. The engagement length D3 is a distance for which the cover 214 is moved relative to the casing 216 when the cover 214 is to be fastened to the casing 216. Specifically, the engagement length D3 is the distance for which the cover 214 is moved relative to the casing 216 from an engagement starting position in which the inner circumferential surface of the bearing-fitting hole 222 starts to be in contact with the outer circumferential surface of the bearing 24, to an engagement completing position in which the engagement of the bearing-fitting hole 222 with the bearing 24 is completed by the contact of the mating surface 214c of the cover 214 with the mating surface 216c of the casing 216. It is noted that the above-described inner circumferential surface of the bearing-fitting hole 222 does not include a chamfered portion, and that the above-described outer circumferential surface of the bearing 24 does not include a chamfered portion.

As shown in FIG. 7, a length Ds is shorter than the above-described engagement length D3, wherein the length Ds is a length of the overlapping portion of the stator core 20 which overlaps with the stator-core-inclination restraining portion 214a in the radial direction and is measured in the axial direction, i.e., the direction parallel with the axis CL, with the mating surface 214c of the cover 214 and the mating surface 216c of the casing 116 being in contact with each other. In this third embodiment, too, it is possible to obtain substantially the same technical advantages as in the above-described first embodiment.

While the preferred embodiments of this invention have been described in detail by reference to the drawings, it is to be understood that the invention may be otherwise embodied.

For example, in the above-described first through third embodiments, each of the stator-core-inclination restraining portions 14a, 114a, 214a consists of four protrusions which are provided on the inner circumference surface of a corresponding one of the covers 14, 114, 214 and which are circumferentially equi-angularly arranged on the circle Cl whose center lies on the axis CL (see FIG. 3). However, each of the stator-core-inclination restraining portions 14a, 114a, 214a may consist of either two or five protrusions, or alternatively, may consist of a single annular-shaped protrusion. Further, where each of the stator-core-inclination restraining portions 14a, 114a, 214a consists of a plurality of protrusions, the protrusions do not necessarily have be equi-angularly arranged. The same description is applied also to each of the stator-core positioning portions 16a, 216a.

In the above-described first through third embodiments, each of the stator-core-inclination restraining portions 14a, 114a, 214a is constituted by the protruding portion provided to protrude from the inner circumferential surface of a corresponding one of the covers 14, 114, 214 toward the casing-cover-side outer circumferential surface 20a of the stator core 20. However, the protruding portion constituting each of the stator-core-inclination restraining portions 14a, 114a, 214a is not necessarily have to be a portion formed integrally with a corresponding one of the covers 14, 114, 214, but may be an independent member such as a screw which is attached to the inner circumferential surface of the corresponding one of the covers 14, 114, 214 and which extends toward the casing-cover-side outer circumferential surface 20a of the stator core 20, for example. The same description is applied also to each of the stator-core positioning portions 16a, 216a. Further, in the above-described first through third embodiments, each of the stator-core-inclination restraining portions 14a, 114a, 214a is constituted by the protruding portion provided to protrude from the inner circumferential surface of a corresponding one of the covers 14, 114, 214. However, the stator-core-inclination restraining portion may be constituted by a protruding portion provided to protrude from the inner circumferential surface of a corresponding one of the casings 16, 116, 216 toward the casing-cover-side outer circumferential surface 20a of the stator core 20.

In the above-described first through third embodiments, each of the positioning engagement mechanisms 40, 140, 240 is constituted partially by the positioning pins 40c, the recessed portion 140a of the casing 116 or the bearing 24. However, positioning screw bolts may be used for fastening each of the covers 14, 114, 214 to a corresponding one of the casings 16, 116, 216, such that the used positioning screw bolts serve as a positioning engagement mechanism.

In the above-described first through third embodiments, the stator core 20 is supported in a cantilever manner to a corresponding one of the bottom walls 16e, 116e, 216e of the respective casings 16, 116, 216 through the plurality of screw bolts 34 that pass through the stator core 20 in the axial direction (i.e., direction parallel with the axis CL). However, the use of the plurality of screw bolts 34 is not essential. For example, the stator core 20 may be fixed, at its end portion 20d on the side of a corresponding one of the casings 16, 116, 216, to a corresponding one of the bottom walls 16e, 116e, 216e of the corresponding one of the casings 16, 116, 216, by press-fitting or the like. Further, although two screw bolts 34 are shown in each of FIGS. 1 and 4-7, the number of the screw bolts 34 is not limited to a particular number. Moreover, although each of the electric motors 10, 110, 210 is a synchronous motor, it may be an induction motor, for example.

In the above-described first embodiment, the positioning engagement mechanism 40 is constituted by the positioning holes 40a provided in the cover 14 and the positioning pins 40c provided in the casing 16. However, the positioning engagement mechanism 40 may be modified such that the positioning pins are provided in the cover 14 while the positioning holes are provided in the casing 16 so that the positioning pins provided in the cover 14 are introduced in the positioning holes 40a provided in the casing 16. Further, the positioning engagement mechanism 40 may be modified such that fitting protrusions are provided on the distal end surface of one of the outer circumferential walls 14d, 16d of the respective cover 14 and casing 16 so as to be fitted in fitting holes provided on the distal end surface of the other of the outer circumferential walls 14d, 16d. In this modified arrangement, each of the fitting protrusions has a protruding length that corresponds to the above-described engagement length D1.

In the above-described first embodiment, the engagement length D1 is a length obtained by subtracting the axial length of the chamfered portion of each positioning hole 40a and the axial length of the chamfered portion of each positioning pin 40c from the introduced length Dm for which each positioning pin 40c is introduced in the corresponding positioning hole 40a (see FIG. 5). However, the introduced length Dm including the axial length of the chamfered portion of each positioning hole 40a and the axial length of the chamfered portion of each positioning pin 40c may be used as the engagement length D1, as long as the contact of the stator-core-inclination restraining portion 14a with the casing-cover-side outer circumferential surface 20a of the stator core 20 can be prevented when the cover 14 is to be fastened to the casing 16. The same description is applied also to each of the engagement lengths D2, D3.

It is to be understood that the embodiments described above are given for illustrative purpose only, and that the present invention may be embodied with various modifications and improvements which may occur to those skilled in the art.

NOMENCLATURE OF ELEMENTS 10, 110, 210: electric motor (vehicle electric motor)
14, 114, 214: cover (casing cover)
14a, 114a, 214a: stator-core-inclination restraining portion
14b, 114b, 214b: inner circumferential surface
14c, 114c, 214c: mating surface
14d, 114d, 214d: outer circumferential wall
16, 116, 216: casing
16a, 216a: stator-core positioning portion
16b, 116b, 216b: inner circumferential surface
16c, 116c, 216c: mating surface
16d, 116d, 216d: outer circumferential wall
16e, 116e, 216e: bottom wall
18: rotor
20: stator core
20a: casing-cover-side outer circumferential surface
20b: casing-side outer circumferential surface
20d: casing-side end portion
34: screw bolts
40, 140, 240: positioning engagement mechanism
CL: axis (about which the rotor 18 is to be rotated)
D1, D2, D3, Dm: engagement length
Ds: length (of an overlapping portion of the stator core 20)
L1: first distance
L2: second distance
L3: third distance
L4: fourth distance

What is claimed is:
1. A vehicle electric motor comprising:
a tubular-shaped stator core constituted by electromagnetic steel sheets that are laminated on each other;
a rotor disposed inside said stator core so as to be rotated about an axis; and
a housing storing therein said tubular-shaped stator core and said rotor, and including a circumferential wall and axially opposite end walls that are opposed to each other in a direction parallel with said axis,
wherein said stator core is fixed at one of axially end portions thereof to one of said axially opposite end walls of said housing,
wherein said housing includes a stator-core-inclination restraining portion that protrudes from an inner circumferential surface of said circumferential wall of said housing toward a part of an outer circumferential surface of said stator core, said part being located on a side of the other of said axially end portions of said stator core,
wherein said housing is constituted by a casing and a casing cover that are fixed to each other,
wherein said casing includes an outer circumferential wall that is a part of said circumferential wall of said housing, a bottom wall that is said one of said axially opposite end walls of said housing and a mating surface that is provided by a distal end surface of said outer circumferential wall of said casing or provided in vicinity of said outer circumferential wall of said casing,
wherein said casing cover includes an outer circumferential wall that is another part of said circumferential wall of said housing, a bottom wall that is the other of said axially opposite end walls of said housing, and a mating surface that is provided by a distal end surface of said outer circumferential wall of said casing cover or provided in vicinity of said outer circumferential wall of said casing cover, wherein said stator core is fixed, at a casing-side end portion thereof that is said one of said axially end portions, to said bottom wall of said casing;

wherein said casing and said casing cover are fixed to each other, with said mating surface of said casing and said mating surface of said casing cover being in contact with each other, wherein said vehicle electric motor comprises a positioning engagement mechanism establishing an engagement by which said casing and said casing cover are positioned relative to each other with said mating surface of said casing and said mating surface of said casing cover being in contact with each other such that an inner circumferential surface of said outer circumferential wall of said casing and an inner circumferential surface of said outer circumferential wall of said casing cover are coaxial with each other, and wherein said stator-core-inclination restraining portion protrudes from an inner circumferential surface of said outer circumferential wall of said casing cover, toward a casing-cover-side outer circumferential surface of said stator core, said casing-cover-side outer circumferential surface being said part of said outer circumferential surface of said stator core which is located on a side of said casing cover.

2. The vehicle electric motor according to claim 1,
wherein said casing includes a stator-core positioning portion that protrudes from said inner circumferential surface of said outer circumferential wall of said casing toward a casing-side outer circumferential surface of said stator core, said casing-side outer circumferential surface being a part of said outer circumferential surface of said stator core which is located on a side of said casing.

3. The vehicle electric motor according to claim 1,
wherein said stator core includes an overlapping portion that overlaps with said stator-core-inclination restraining portion in a direction perpendicular to said axis about which said rotor is to be rotated, and
wherein said overlapping portion of said stator core has a length measured in an axial direction parallel with said axis while said engagement established by said positioning engagement mechanism has a length measured in said axial direction, such that said length of said overlapping portion of said stator core is shorter than said length of said engagement, with said mating surface of said casing and said mating surface of said casing cover being in contact with each other.

4. The vehicle electric motor according to claim 1,
wherein said stator-core-inclination restraining portion and said casing-cover-side outer circumferential surface of said stator core are spaced apart from each other by a first distance measured in a direction perpendicular to said axis about which said rotor is to be rotated,
wherein a casing-cover-side inner circumferential surface of said stator core and a casing-cover-side outer circumferential surface of said rotor are spaced apart from each other by a fourth distance measured in said direction perpendicular to said axis, said casing-cover-side inner circumferential surface of said stator core being a part of an inner circumferential surface of said stator core which is located on a side of said casing cover, said casing-cover-side outer circumferential surface of said rotor being a part of an outer circumferential surface of said rotor which is located on a side of said casing cover, and
wherein said first distance is shorter than said fourth distance.

5. The vehicle electric motor according to claim 1,
wherein said stator-core-inclination restraining portion and said casing-cover-side outer circumferential surface of said stator core are spaced apart from each other by a first distance measured in a direction perpendicular to said axis about which said rotor is to be rotated,
wherein said inner circumferential surface of said outer circumferential wall of said casing cover and said casing-cover-side outer circumferential surface of said stator core are spaced apart from each other by a second distance measured in said direction perpendicular to said axis,
wherein an inner circumferential surface of said outer circumferential wall of said casing and a casing-side outer circumferential surface of said stator core are spaced apart from each other by a third distance measured in said direction perpendicular to said axis, said casing-side outer circumferential surface being a part of said outer circumferential surface of said stator core which is located on a side of said casing, and
wherein said first distance is shorter than said second distance and said third distance.

6. The vehicle electric motor according to claim 1,
wherein said mating surface of said casing and said mating surface of said casing cover, which are in contact with each other, are located in respective positions that overlap with said stator core in a direction perpendicular to said axis about which said rotor is to be rotated.

7. The vehicle electric motor according to claim 1,
wherein said stator-core-inclination restraining portion is a protruding portion which is integrally formed with said casing cover and which protrudes from said inner circumferential surface of said outer circumferential wall of said casing cover toward said casing-cover-side outer circumferential surface of said stator core.

8. The vehicle electric motor according to claim 1,
wherein said stator core is fastened to said bottom wall of said casing through a plurality of screw bolts that pass through said stator core in an axial direction parallel with said axis about which said rotor is to be rotated.

* * * * *